July 18, 1944.  E. FLETCHER  2,353,887

FIBER ATTENUATING APPARATUS

Filed March 25, 1942  3 Sheets-Sheet 1

INVENTOR
Ed Fletcher,
BY
ATTORNEY

July 18, 1944.  E. FLETCHER  2,353,887
FIBER ATTENUATING APPARATUS
Filed March 25, 1942   3 Sheets-Sheet 2
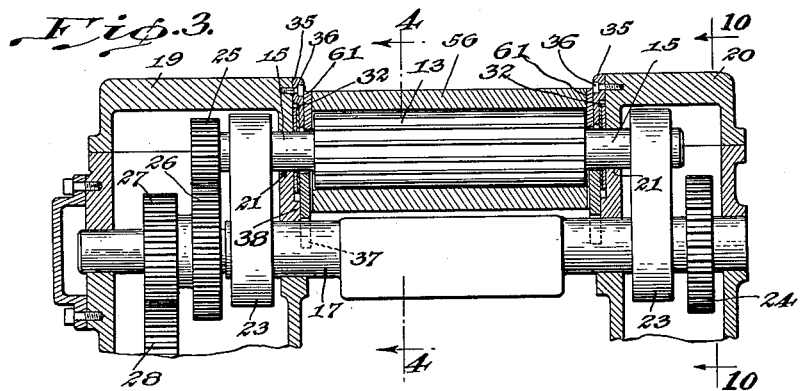
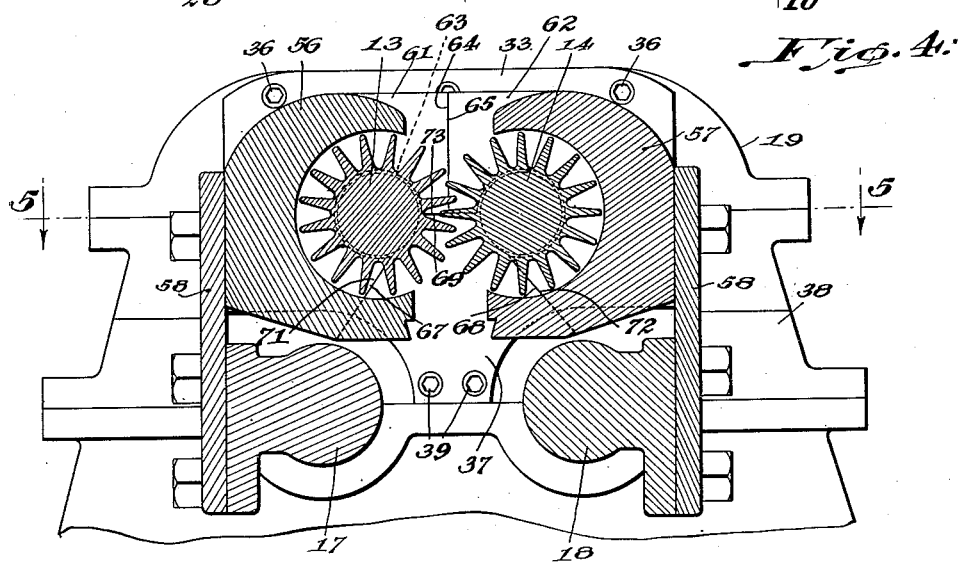
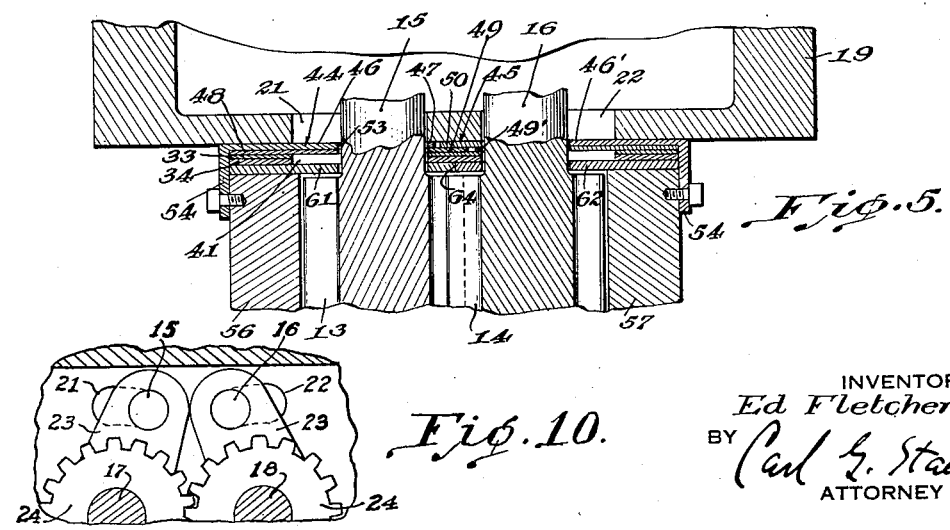
INVENTOR
Ed Fletcher,
BY Carl G. Staelin
ATTORNEY July 18, 1944.  E. FLETCHER  2,353,887
FIBER ATTENUATING APPARATUS
Filed March 25, 1942  3 Sheets-Sheet 3
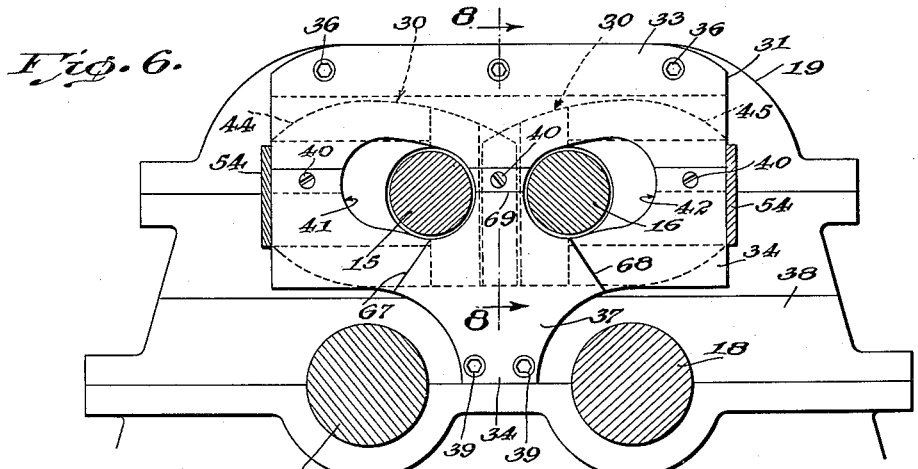
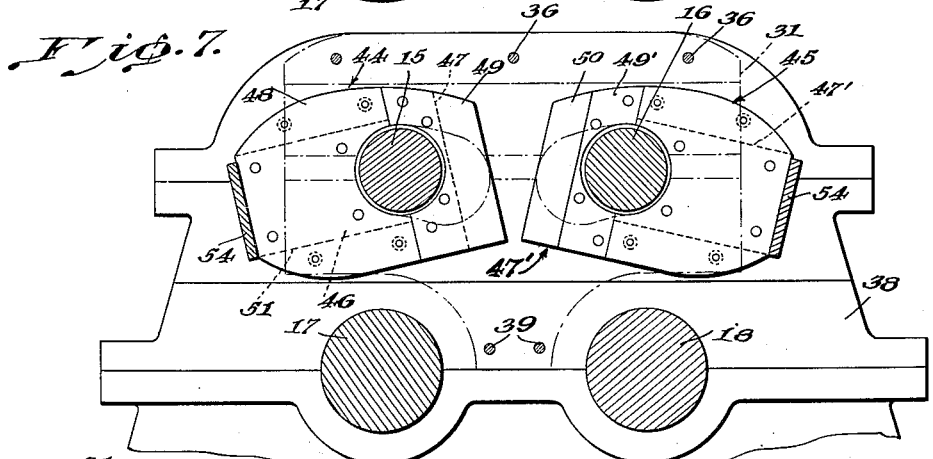
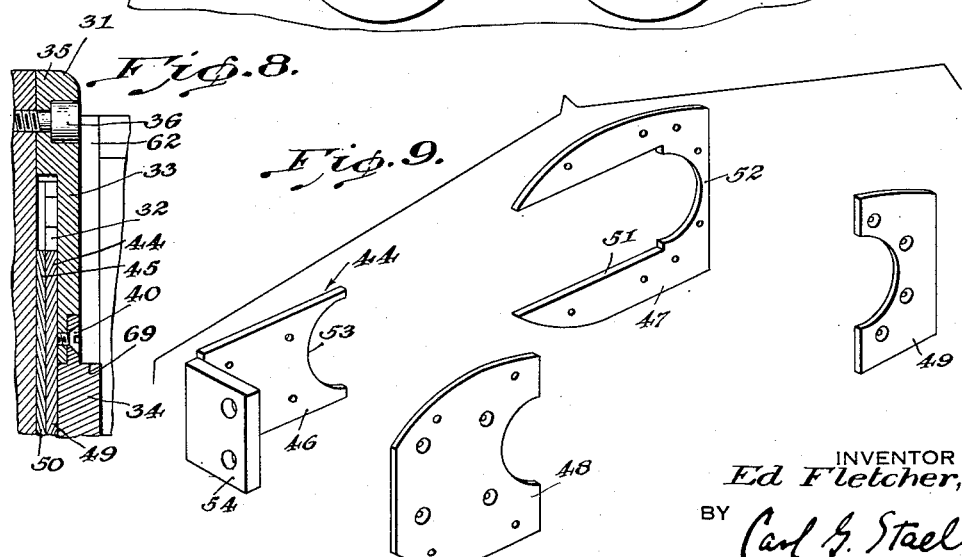
INVENTOR
Ed Fletcher,
BY
Carl G. Staelin
ATTORNEY Patented July 18, 1944

2,353,887

UNITED STATES PATENT OFFICE 2,353,887

FIBER ATTENUATING APPARATUS

Ed Fletcher, Newark, Ohio, assignor to Owens-Corning Fiberglas Corporation, a corporation of Delaware Application March 25, 1942, Serial No. 436,127

5 Claims. (Cl. 49—17)

This invention relates to fiber attenuating apparatus and refers more particularly to improvements in equipment of this type having coacting intermeshing toothed members for exerting a pulling force on streams of molten glass and similar material passing therebetween.

The toothed members are in spaced apart relation prior to starting of the operation and the glass stream flows between them without engaging either. The members while rotating at high speed are then shifted relatively toward each other and into meshing relation to engage the stream between them and attenuate the stream. The toothed members are carried by supporting structure including housings having elongated slots in the inner or adjacent walls for receiving the drive shafts for the toothed members and having provision for supporting the driving and adjusting mechanism for the toothed members.

The slots are of substantial length in order to permit the desired shifting movement of the toothed members and, accordingly, foreign matter, such as dirt, oil and particles of glass or other fiber material, may enter the housings. This entry of foreign matter into the housings through the slots is objectionable especially in cases where glass fibers are being produced because particles of glass enter the housing and abrade the driving and journaling parts to wear them and cause excessive play and backlash, which are intolerable in this apparatus where the teeth of the intermeshing attenuating gears are to rotate at very high speed out of contact with each other.

With the above in view, the present invention contemplates overcoming the above objection by sealing the slots with closure members which are slidable as a unit with the toothed members and coact with the drive shafts of the toothed members to seal the slots in all positions of the shafts relative to the supporting structure.

The foregoing, as well as other objects, will be made more apparent as this description proceeds, especially when considered in connection with the accompanying drawings, wherein:

Figure 3 is a sectional view taken substantially on the line 3—3 of Figure 2;

Figure 4 is a cross-sectional view taken on the line 4—4 of Figure 3;

Figure 5 is a sectional view taken substantially on the line 5—5 of Figure 4;

Figure 6 is a cross-sectional view taken substantially on the line 6—6 of Figure 1 and showing the parts in one relative position of adjustment;

Figure 7 is a sectional view similar to Figure 6 showing the parts in another relative position of adjustment, and with other parts removed but indicated by broken lines;

Figure 8 is a sectional view taken on the line 8—8 of Figure 6;

Figure 9 is a group perspective view of various parts of the seal; and,

Figure 10 is a cross-sectional detail view taken in the plane of the line 10—10 of Figure 3.

Figure 1:
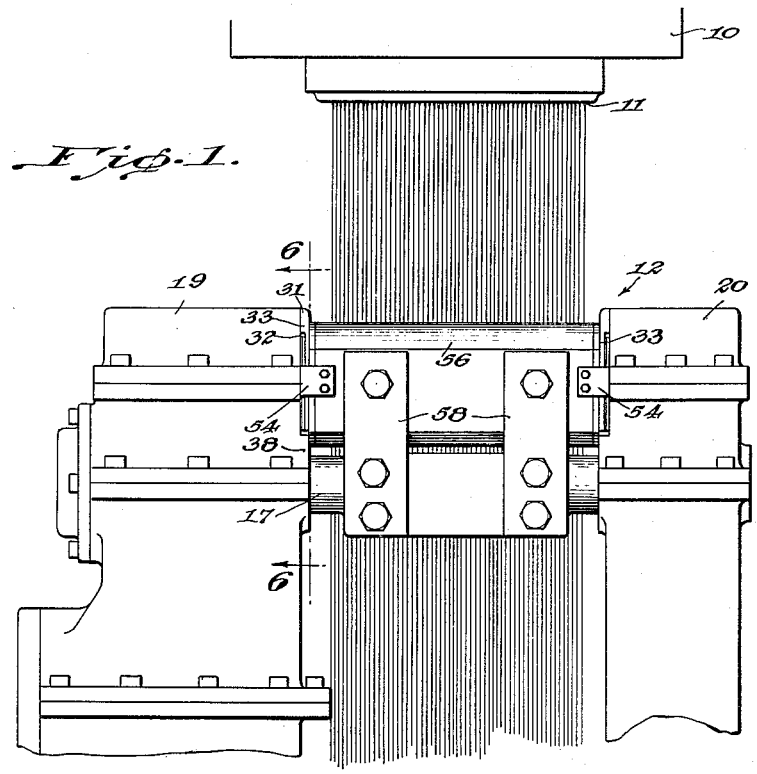
Figure 1 is a fragmentary side elevational view of fiber attenuating apparatus embodying the seal constructed in accordance with this invention.
Figure 2:
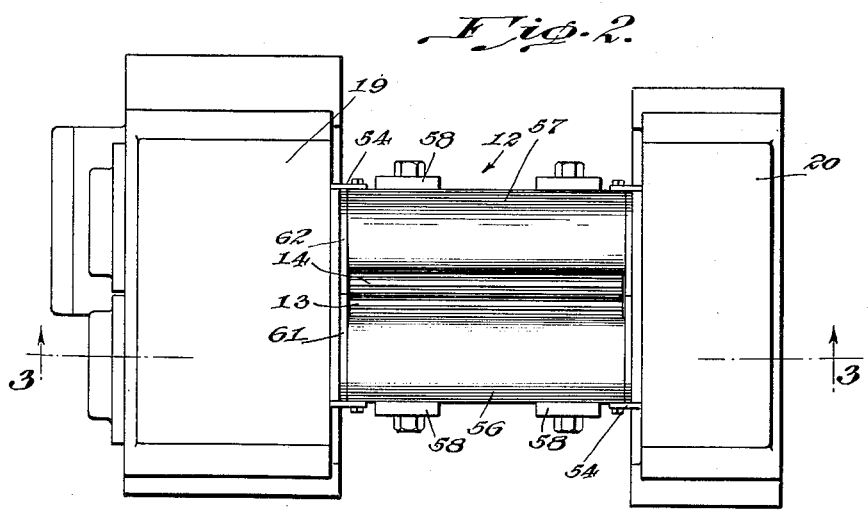
Figure 2 is a plan view of the construction shown in Figure 1.

In Figure 1 of the drawings the reference character 10 designates a feeder having a plurality of laterally spaced orifices 11 in the bottom wall thereof. The feeder 10 may be similar to the one shown in the United States Thomas and Fletcher Patent No. 2,165,318 and is adapted to contain material suitable for the formation of fibers. The material may be either organic or inorganic depending on the nature of the fibers to be formed. For the purpose of this description, it will be assumed that glass fibers are specified and, accordingly, the feeder 10 is filled with molten glass. The temperature of the glass in the feeder is such that streams of glass issue continuously from the orifices 11 in the bottom of the feeder.

The streams of glass issuing from the orifices 11 flow toward a traction device 12 supported below the feeder 10 and operable to attenuate the streams to form the desired fibers. The traction device 12 comprises revolvable toothed members 13 and 14 having end stub shafts 15 and 16, respectively, supported in such relationship that the teeth on the members intermesh without actually contacting each other. The streams of glass pass between the coacting intermeshing teeth and the latter apply a pulling force on the fibers issuing from the orifices 11 in the feeder 10.

Attenuation of the streams by the coacting toothed members is started and stopped by shifting the members toward and away from each other and into and out of mesh. In the present instance the coacting toothed members 13 and 14 are respectively swung in directions toward and away from each other about the axes of a pair of rock shafts 17 and 18 supported in parallel relationship to the drive shafts 15 and 16. As shown in Figure 3 of the drawings, the opposite ends of the rock shafts respectively extend through openings in the adjacent or inner walls of a pair of housings 19 and 20 which constitute part of the supporting structure of the traction device.

The inner wall of each housing has a pair of slots 21 and 22 of sufficient dimension to receive the shafts 15 and 16, respectively. The slots are preferably arcuate about a center coinciding with the axes of rotation of the rock shafts 17, 18. They are elongated as shown in Figures 5 and 10 to enable sufficient swinging movement of the toothed members 13 and 14 about the respective axes of the rock shafts 17 and 18 to obtain the required meshing and unmeshing relations of the toothed members.

Referring again to Figures 3 and 5 of the drawings, it will be noted that the opposite stub shafts 15 for the toothed member 13 project through the slots 21 into the housings and are respectively journaled on the upper ends of a pair of bearing arms 23 having the lower ends fixed to the rock shaft 17. The stub shafts 16 for the toothed member 14 project into the housings 19 and 20 through the slots 22 and are journaled in the outer ends of similar bearing arms fixed to the rock shaft 18. The two rock shafts are interconnected for synchronized rocking movement in opposite directions by intermeshing gears 24 located in the housing 20 and respectively secured to the rock shafts 17 and 18. The above construction is such that rocking movement of the shafts 17 and 18 in opposite directions effects a swinging movement of the toothed members toward or away from each other. Swinging movement of the toothed members toward each other brings the teeth on the members into intermeshing relation to cause attenuation of the streams. On the other hand, swinging movement of the toothed members in directions away from each other causes the teeth to move out of intermeshing relation and interrupts attenuation.

The toothed members may be moved in the manner set forth above without interfering with or discontinuing the operation of the driving means for rotating the toothed members. As shown in Figure 3, a pinion 25 is secured to the stub shaft 15. A similar pinion (not shown) is secured to the other end of the stub shafts, 16. These pinions respectively mesh with gears 26 freely rotatably mounted on the rock shafts 17 and 18, respectively. The gears 26 are arranged in intermeshing relation and the gear 26 on the rock shaft 17 is driven by a gear 27 integral therewith or fixed thereto. The gear 27 is also freely rotatably mounted on the rock shaft 17 and meshes with a gear 28 which is driven by any suitable driving mechanism (not shown). The above construction is such that the toothed members are rotated in opposite directions by the gearing and the pinions 25 on the drive shafts 15 and 16 merely travel along the peripheral portions of the gears 26 upon swinging movement of the toothed members about the respective axes of the rock shafts 17 and 18.

The driving gears previously described are enclosed in the housing 19 and the rock shaft operating gears 24 are located in the housing 20. As stated above, the elongated slots 21 and 22 are formed in the inner walls of the housings to receive the opposite ends of the drive shafts and unless some provision is made for closing these slots foreign matter such as dirt and glass particles may readily enter the housings through the slots. This is particularly true in the present instance where the teeth on the coacting toothed members are of a nature to create considerable turbulence in the ambient atmosphere and this turbulent atmosphere increases the liability for foreign matter to enter the housings through the elongated slots.

The accumulation of foreign matter and especially particles of glass on the gearing and bearing surfaces is detrimental to the life of the parts and is avoided in the present instances by providing an effective seal 30 for each slot. The sealing arrangement associated with each housing is identical and, accordingly, only one is described in detail herein. As shown in Figures 3 to 8, inclusive, a plate 31 is secured to the outer surface of the inner wall of the housing 19 and cooperates with the latter to form a recess 32 opposite the slots 21 and 22. In the interests of simplicity and convenience in assembly the plate 31 is formed of upper and lower sections 33 and 34, respectively (Figure 8).

The upper section 33 is spaced from the inner wall of the housing 19 by a pad 35 extending along its top edge and is secured to the inner wall of the housing by suitable fastener elements 36 extending through the pad 35 into the housing. The lower section 34 is provided with a narrow depending extension 37 (Figures 3 and 6) which is secured by screws 39 to a raised portion 38 of the housing between the rock shafts 17 and 18. The adjacent edges of the sections are secured together by screws 40 and are preferably rabbeted to provide a flush connection therebetween at the side facing the wall of the housing. Both sections have laterally spaced recesses at their adjacent edges which cooperate in the assembled position of the sections to form elongated slots 41 and 42. The slots 41 and 42 correspond in size to and register with the slots 21 and 22, respectively, in the adjacent wall of the housing to receive the stub shafts 15 and 16, respectively.

A pair of closures 44 and 45 are supported in the recess 32 for sliding movement and cover the slots 21 and 22, respectively. As shown in Figure 9, the closure 44 comprises four parts designated by the reference characters 46, 47, 48 and 49. The part 47 has an elongated slot 51 which is open at the outer end and is closed at the inner end by a wall 52 having a radius which corresponds to the radius of the adjacent stub shaft. The part 46 is received in the slot 51 through the open outer end of the latter and has an inner wall 53 which cooperates with the wall 52 on the part 47 to form an opening of sufficient diameter to receive one of the stub shafts 15 or 16. The part 48 acts as a tie plate and is secured to both of the parts 46 and 47 in overlapping relation. The part 49 forms an offset extension of the inner end of the part 47 and is secured to the inner edge portion of the latter. The closure 45 is similar to the closure 44 except that the parts are reversed and the part 47' of the closure 45 is extended at its inner end as at 50 to overlap the extension 49 on the closure 44 when the closures are in innermost position. The part 49' of the closure 45 is shortened as shown in Figures 6 and 7 to provide for the overlapping relation of the extension 49 of the closure 44 and the end 50 of the closure 45 (Figure 6).

The closures 44 and 45 move as a unit with the toothed members 13 and 14 during swinging movement of the latter into and out of intermeshing relation. In the present instance the parts 46 of the closures are provided with right angle attaching flanges 54, respectively, secured to shields 56 and 57 for the toothed members 13 and 14 (Figure 5). The shields extend for substantially the full length of the toothed members around the outer sides of the latter and are respectively secured to the rock shafts 17 and 18 intermediate the ends of the latter by brackets 58. The purpose of these shields is to guard the toothed members and confine the air disturbed by them during their rotation and to control the distribution of this air so that it does not overcool the streams of glass issuing from the orifices 11.

Inasmuch as the shields are secured to the rock shafts for rocking movement by the latter as a unit with the toothed members and since the closures are respectively secured to the shields, it follows that the closures are shifted in the recesses 32 by the rock shafts. As described above, the construction of the closures is such that they cooperate with the drive shafts for the toothed members to effectively seal the elongated slots 21 and 22 through the inner walls of the housings throughout the extent of adjustment of the toothed members toward and away from each other. As a result, foreign matter, such as dirt, oil and particles of glass, are prevented from entering the housings and accumulating on the gearing and bearings enclosed therein.

My invention also provides seals for the space 32 in which the closures 44 and 45 are located. These seals are in the form of plates 61, 62 secured to the ends of the shields 56, 57. The plates are provided with openings 63 which surround the adjacent stub shafts and with abutting faces 64, 65 (Figure 4) which are in engagement when the gear members 13 and 14 are in mesh to the full desired extent. The plates 61 and 62 fit closely against the plates 31 on the housings to close the space between the ends of the shields 56 and 57 and the plates 31 to thereby prevent passage of glass particles through the slots 41, 42 in said plates and into the spaces 32.

The lower half 34 of each plate 31 has a raised portion of a thickness corresponding substantially to the thickness of the plates 61 and 62 and providing shoulders 67, 68 and 69. The shoulders 67 and 68 abut inclined faces 71, 72 (Figure 4) on the lower portions of the plates 61, 62 and the shoulders 69 abut the edge faces 73 on said plates when the gear members are in mesh to full desired extent. Thus, all of the space between the ends of the shields 56, 57 and the plates 31 is closed by the plates 61, 62 and the raised portion of the plate 31 bounded by the shoulders 67, 68 and 69.

Various modifications and variations may be made within the spirit and scope of the appended claims.

I claim:

1. Apparatus for attenuating fibers comprising supporting structure having a wall provided with an elongated slot therethrough, coacting intermeshing toothed members fixed to drive shafts, supporting bearing means for said drive shafts adapted for movement to cause lateral shifting movement of one drive shaft relative to the other shaft for varying the extent of intermeshing of the teeth on said toothed members, said laterally shiftable drive shaft being received through said elongated slot, a plate fixed to said wall and overlying the slotted portion of the wall in spaced relation and provided with an opening aligned with said slot, a closure plate mounted in the space between said wall and said first-named plate for sliding movement in the general direction of the slot, and means connecting said closure plate with said movable bearing means to cause said closure plate to move with the shiftable shaft to seal the slot throughout shifting movement of the latter shaft relative to the supporting structure.

2. In fiber-attenuating and the like apparatus, the combination of a housing having a wall provided with an elongated slot therein, an attenuating member fixed to a rotatable shaft passing through the slot in said wall, a bearing for said shaft within said housing fixed to a rock shaft rotatably journaled in said housing in parallel relation with said shaft whereby the said rotatable shaft may be laterally translated, a shield for said attenuating member secured to said rock shaft, a plate fixed to the outside of the wall of the housing and overlying in spaced relation the portion of the wall surrounding said slot, the outer wall of the plate abutting the end of said shield for the attenuating member, an opening in said plate aligned with said slot, and a closure plate in the space between said first-named plate and said housing wall overlying said slot and having an opening therethrough closely surrounding said shaft, said closure plate being secured to said shield for movement with said rock shaft and said rotatable shaft.

3. In fiber-attenuating and the like apparatus, the combination of a housing having a wall provided with a pair of spaced elongated slots therein, a pair of attenuating members fixed respectively to rotatable shafts passing through the slots in said wall, bearings for said shafts within said housing fixed to rock shafts rotatably journaled in said housing in parallel relation with said shafts whereby the rock shafts may be translated toward and away from each other, a plate secured to the outside of the wall of the housing and overlying in spaced relation the portion of the wall surrounding said slots, openings in said plate aligned respectively with said slots to receive said rotatable shafts therethrough, closure plates in the space between said first-named plate and said housing wall overlying respectively said slots and having openings therethrough closely surrounding said rotatable shafts, said closure plates being supportingly connected with said rock shafts for movement with said rock shafts and said rotatable shafts, the adjacent end portions of said closure plates being relatively offset and arranged to overlap when the rotatable shafts are translated into positions of closest approach.

4. In fiber-attenuating and the like apparatus, the combination of a housing having a wall provided with a pair of spaced elongated slots therein, a pair of attenuating members fixed respectively to rotatable shafts passing through the slots in said wall and journaled in relatively movable bearings whereby the shafts may be translated toward and away from each other, shields for said attenuating members supported for translative movement with said shafts, a plate secured to the outside of the wall of the housing and overlying in spaced relation the portion of the wall surrounding said slots, the outer wall of the plate being provided with areas of reduced thickness to form a pair of recesses, the ends of said shields adjacent said plate being substantially coextensive with said areas of reduced thickness to be received within said recesses, openings in said plate aligned respectively with said slots, and closure plates in the space between said first-named plate and said housing wall overlying respectively said slots and having openings therethrough closely surrounding said shafts, said closure plates being supported for movement with said shafts.

5. In fiber-attenuating and the like apparatus, the combination of a housing having a wall provided with a pair of spaced elongated slots therein, a pair of attenuating members fixed respectively to rotatable shafts passing through the slots in said wall and journaled in relatively movable bearings whereby the shafts may be translated toward and away from each other, shields for said attenuating members supported for translative movement with said shafts, a plate secured to the outside of the wall of the housing and overlying in spaced relation the portion of the wall surrounding said slots, the outer wall of the plate being provided with areas of reduced thickness to form a pair of recesses, abutment shoulders bounding the sides of said recesses adjacent said shafts, the ends of said shields being received in said recesses and having abutment faces adapted to engage said shoulders when said translatable shafts are moved in position of closest approach, openings in said plate aligned respectively with said slots, and closure plates in the space between said first-named plate and said housing wall overlying respectively said slots and having openings therethrough closely surrounding said shafts, said closure plates being supported for movement with said rock shafts.

ED FLETCHER.